United States Patent
Eitzer et al.

(10) Patent No.: US 12,508,942 B2
(45) Date of Patent: Dec. 30, 2025

(54) ADJUSTING BATTERY SOC BASED ON FUTURE USE OF AN ELECTRIC VEHICLE

(71) Applicant: Toyota Motor Engineering & Manufacturing North America, Inc., Plano, TX (US)

(72) Inventors: Arlo C. Eitzer, Ann Arbor, MI (US); Lisa B. DiMaggio, Ann Arbor, MI (US); Allison McGowan, Ann Arbor, MI (US); Emily S. Lerner, Ypsilanti, MI (US); Alessandro Concas, Belleville, MI (US); Abril A. Galang, Ypsilanti, MI (US); Jordan Choby, Ann Arbor, MI (US); Max K. Ralya, Ypsilanti, MI (US); Tapan V. Patel, South Lyon, MI (US); Benjamin J. Groelke, Ann Arbor, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 916 days.

(21) Appl. No.: 17/520,129

(22) Filed: Nov. 5, 2021

(65) Prior Publication Data
US 2023/0141525 A1    May 11, 2023

(51) Int. Cl.
*B60L 58/12* (2019.01)
*G01R 31/367* (2019.01)
*H01M 10/48* (2006.01)
*H01M 10/42* (2006.01)

(52) U.S. Cl.
CPC ............ *B60L 58/12* (2019.02); *G01R 31/367* (2019.01); *H01M 10/482* (2013.01); *B60L 2260/52* (2013.01); *H01M 2010/4271* (2013.01)

(58) Field of Classification Search
CPC ........................................................ B60L 58/12
USPC ........................................................ 320/109
See application file for complete search history.

(56) References Cited

U.S. PATENT DOCUMENTS

| | | | |
|---|---|---|---|
| 9,043,106 B2* | 5/2015 | Ingram ................. | B64D 33/00 701/423 |
| 10,611,371 B2* | 4/2020 | Kusano ........... | B60W 60/00274 |
| 2015/0369874 A1* | 12/2015 | Park ........................ | B60L 58/12 702/63 |
| 2018/0188332 A1* | 7/2018 | Newman ................ | B60K 35/10 |

(Continued)

OTHER PUBLICATIONS

Ching-Shin Norman Shiau et al., "Impact of Battery Weight and Charging Patterns on the Economic and Environmental Benefits of Plug-in Hybrid Vehicles", Energy Policy, Jul. 2009, pp. 2653-2663, vol. 37, Issue 7.

*Primary Examiner* — Yalkew Fantu
(74) *Attorney, Agent, or Firm* — Jordan IP Law, LLC

(57) ABSTRACT

A battery manager includes a pattern estimator, a prediction engine, and a charging scheduler. The pattern estimator estimates a driving pattern of an electric vehicle. The prediction engine predicts a charging parameter based on at least one of the driving pattern or driver charging behavior. The charging scheduler outputs the charging parameter to control charging of a secondary battery of the electric vehicle. The pattern estimator may estimate the driving pattern based on information from at least one information source of the electric vehicle. The prediction engine predicts the charging parameter of the secondary battery in preparation of a future use of the electric vehicle.

20 Claims, 8 Drawing Sheets

(56) References Cited

U.S. PATENT DOCUMENTS

2020/0160619 A1* 5/2020 Wang ................... G06N 20/00
2020/0164763 A1* 5/2020 Holme ................... B60L 58/16
2020/0331452 A1* 10/2020 Ferreira De Araujo ...................
                                                    B60W 20/11

* cited by examiner

EXAMPLES OF STORAGE AREA INFORMATION
(Single Driver or Multiple Drivers)

Navigation System Information
- Starting Point
- Destination
- Routes
- Travel Time
- Travel Duration
- Travel Distance
- Traffic Conditions
- Travel Days
- Average Vehicle Speed
- Peak Vehicle Speed
- RPMs Number of Passengers Vehicle Status
- Number of People
- Cargo on Roof
- Pulling a Trailer
- Vehicle Weight Driver Comfort Travel Conditions
- Weather Driver Changing Behavior

FIG. 3

| Driving Pattern 610 | Rules 620 | Time Until Use 630 | Charging Parameter(s) 640 |
|---|---|---|---|
| Commuter Pattern 611 | First Range 621 | 10 Hours 631 | 60% Capacity, Normal Charging Rate 641 |
| Weekend Pattern 612 | Second Range 622 | 15 Hours 632 | 40% Capacity, Slow Charging Rate 642 |
| Weather Pattern (Snow) 613 | Extended Duration 623 | 10 Hours 633 | 80% Capacity, Fast Charging Rate 643 |
| Trailer Pattern 614 | Extended Range 624 | 36 Hours 634 | 80% Capacity, Slow Charging Rate 644 |

FIG. 6

ADJUSTING BATTERY SOC BASED ON FUTURE USE OF AN ELECTRIC VEHICLE

FIELD

One or more embodiments described herein relate to charging a battery of an electric vehicle.

BACKGROUND

Electric vehicles are steadily gaining popularity and market share in countries around the world. The reasons are many and varied. For example, electric vehicles offer a cost-effective alternative to gas-powered vehicles in terms of fuel cost savings and adverse environmental impact. Not surprisingly, most vehicle manufacturers have shifted the focus of their product lines to offering improved electric vehicles that are able to better serve the needs of their customers.

One of the main concerns of system designers is battery management. The more efficient the battery management schedule, the farther a traveler can go without having to stop for battery recharging purposes. Battery management is often performed on a state-of-charge basis that involves charging the battery to full capacity each time a recharge is performed. Consequently, existing battery management methods do not take into consideration the driving patterns or operational requirements of each particular vehicle or driver. This results in reducing the useful life of the battery and adversely affects driver convenience.

SUMMARY

Embodiments described herein include a system and method for controlling charging of a secondary battery of an electric vehicle.

In accordance with one embodiment, a battery manager includes a pattern estimator to estimate a driving pattern of an electric vehicle; a prediction engine to predict a charging parameter based on the driving pattern; an a charging scheduler to output the charging parameter to control charging of a secondary battery of the electric vehicle, wherein the pattern estimator is to estimate the driving pattern based on information from at least one information source of the electric vehicle and wherein the prediction engine is to predict the charging parameter of the secondary battery in preparation of a future use of the electric vehicle.

In accordance with one embodiment, a method of managing an electric vehicle includes receiving information from an information source; estimating a driving pattern based on the received information; predicting a charging parameter of a secondary battery based on the driving pattern; and outputting the charging parameter to control charging of the secondary battery, wherein predicting the charging parameter includes predicting the charging parameter of the secondary battery in preparation of a future use of the electric vehicle.

BRIEF DESCRIPTION OF THE DRAWINGS

FIG. 3 shows example information for charging the secondary battery.
FIG. 6 shows an example of predicted driving patterns and one or more corresponding charging parameters.

DETAILED DESCRIPTION

Figure 1:
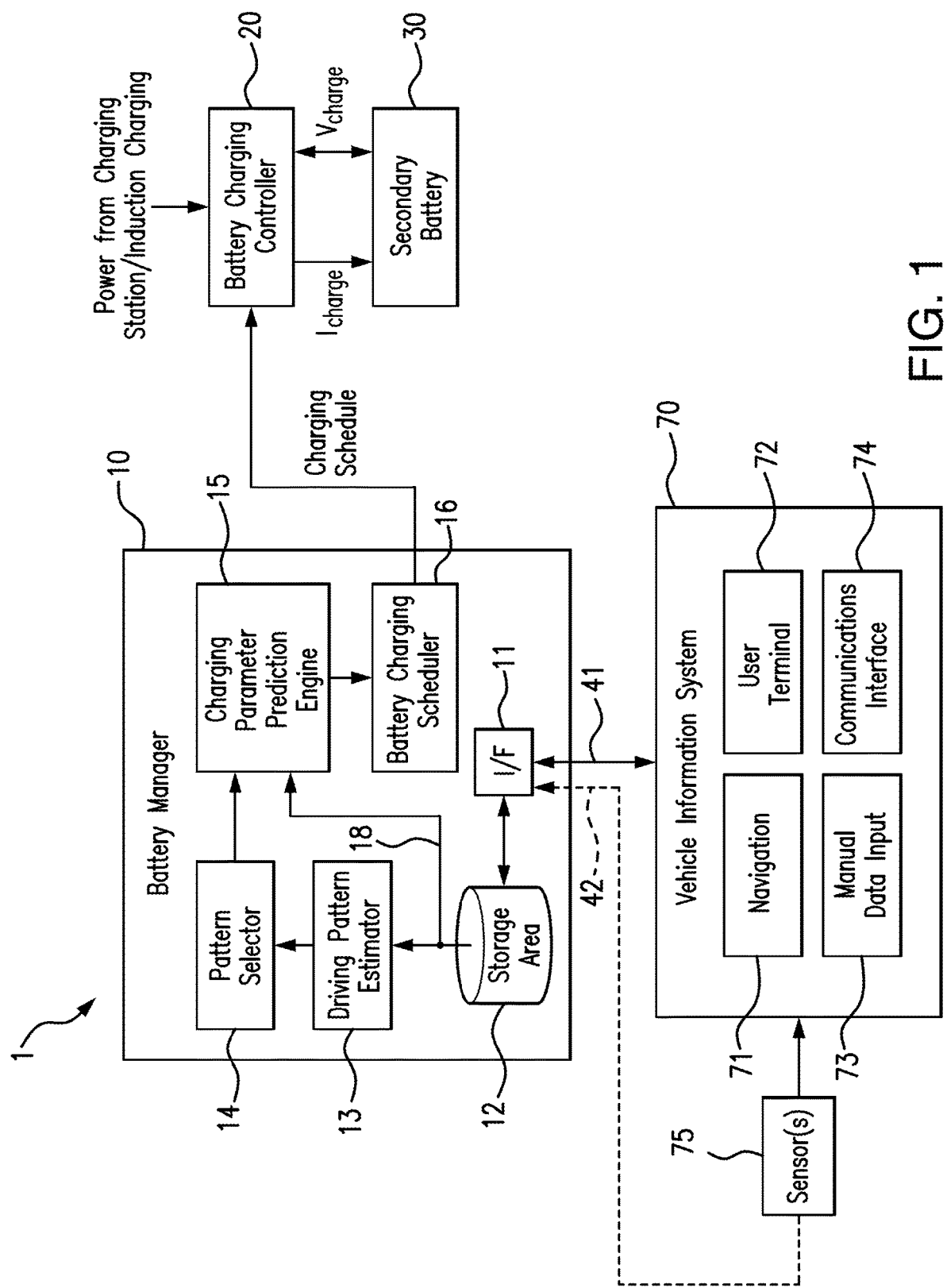
FIG. 1 shows an embodiment of a system for charging a secondary battery.

FIG. 1 shows an embodiment of a system 1 that may be used to control the charging of a secondary (e.g., repeatedly rechargeable) battery of an electric vehicle. Charging of the secondary battery may be controlled, for example, when the vehicle is stationary and plugged into a charging station and/or during driving, for example, based on an induction-charging operation. The electric vehicle may be, for example, a hybrid vehicle, plug-in hybrid vehicle, a fuel-cell vehicle, or any other vehicle that is partially or fully powered by electricity. For convenience purposes, these vehicles may be collectively referred to as electric vehicles.

Referring to FIG. 1, the system includes a battery manager 10 which is coupled to one or more sources of information to be used to control charging of the secondary battery at a scheduled time in the future. The sources of information may include various sensors and information processing systems built into or in communication with the vehicle. In one embodiment, at least a portion of the information sources may be a vehicle information system 70.

The vehicle information system 70 may collect and manage information relating to operation of the vehicle and/or any of its attendant features. In the example embodiment of FIG. 1, the vehicle information system 70 may include a navigation system 71, a user terminal 72, a manual data input 73 and a communications interface 74. In other embodiments, a different combination of features may be included in the vehicle information system 70.

The vehicle information system 70 may be built into the control software of the vehicle and/or be operative with a navigation application on the user terminal 72, e.g., a smartphone linked to the vehicle information system 70. The navigation system 70 may track information concerning vehicle use for storage in an internal memory of the vehicle information system 70 and/or for output to a storage area in the battery manager 10. Examples of information that may be tracked by the navigation system include, but are not limited to, routes driven during vehicle use, the distance driven on each of the routes, time when the vehicle travels those routes, the duration of time from a starting point to a destination point along the routes and traffic conditions that existed during travel along each of the routes, as well as other information.

The manual data input 73 may be incorporated within a user interface of the vehicle information system. For example, the user interface may be an input touch screen and/or one or more control knobs other forms of data input for an entertainment system of the vehicle, that is also functionally used to control various vehicle systems such as media applications, temperature control, navigation maps and diagnostic information, as well as other information. In one embodiment, an application (or other functional feature) of the manual data input 73, when activated, may allow a user to input data corresponding to vehicle use for a particular driver. The input data may include, for example, routes to be driven by the driver, time when the driver is to travel on those routes, the duration of time from a starting point to a destination point along the routes, destinations of travel, starting time to be driven, number of passengers in the vehicle when traveling on the designated routes, driver comfort information, and vehicle status information (e.g., whether the vehicle is pulling a trailer, carrying cargo on the roof, etc.).

The communications interface 74 may include a receiver to receive information from a remote source such as a host system or network server. For example, through the communications interface, the vehicle information system 70 may communicate with various entities through the internet for receiving information to be taken into consideration by the battery manager 10 for controlling a charging operation of the vehicle at a point in the future. Examples of information that may be received through the communications unit 74 include weather and traffic information.

In addition to the foregoing features, the vehicle information system 70 may include or be coupled to various sensors 75 of the vehicle. These sensors may, for example, detect average and/or peak vehicle speed, variations in vehicle speed, revolutions per minute (RPMs) information and/or other information. In one embodiment, one or more of the sensors 75 may be coupled to the battery manager along a signal path 78 that bypasses the vehicle information system.

The battery manager 10 may control the charging of the secondary battery 30 based on information from one or more information sources, including but not limited to the vehicle information system 70. The charging may be performed to partially charge (e.g., to a level less than full capacity) or fully charge the secondary battery based on an anticipated (or future) use of the vehicle. This may be accomplished by determining at least one driving pattern of the vehicle (and/or for a particular driver of the vehicle) and then generating one or more charging parameters that may be used as a basis for charging the vehicle for the anticipated use consistent with and based on the assumption that the at least one driving pattern will be followed in one or more subsequent driving sessions for the vehicle.

In one embodiment, the battery manager 10 may include an interface 11, at least one storage area 12, a driving pattern estimator 13, a pattern selector 14, a charging parameter prediction engine 15, and a battery charging scheduler 16.

The interface 11 receives information (or signals) from one or more information sources, including but not limited to the vehicle information system 70 and/or sensors 75. The information (or signals) may be received along wired or wireless signal links depending, for example, on the type of information source. For example, when the information source is the vehicle information system 70, interface 11 may receive information from vehicle information system 70 along the signal line(s) of an internal communications bus 41 of the vehicle. If information is to be received from the sensor(s) 75 separate from the vehicle information system, then, for example, signals from the sensor(s) may be received along signal path 42. If the information source is to be received from the user terminal 72 directly, then the interface may receive the information along a wireless (e.g., Bluetooth) link activated within the vehicle.

The storage area 12 stores the information received from the one or more information sources. The storage area may be, for example, an internal vehicle database, memory, buffer, or another type of device capable of storing information and data. In one embodiment, the information is indicative of various types of driving conditions, driving parameters, and/or the charging behavior of a driver. The driving conditions and/or parameters may be collected during every driving session of the vehicle. Examples of the driving conditions and/or parameters include driving times of day and night, driving days of the week, driving routes, driving sources and destinations, number of driving trips on a per-day basis as distinguished from other days of the week, driving speed, vehicle electrical load, detect average and/or peak vehicle speed, variations in vehicle speed, revolutions per minute (RPMs) information, vehicle weight (as determined, for example, by sensors on the shock absorbers or tire pressure gauges), weather conditions and traffic conditions as well as other driving conditions and parameters. The charging behavior of a driver may include, for example, how often the driver charges the vehicle, e.g., every night, a few times per week, etc.

In addition to the aforementioned information, additional types of information may be stored in the storage area 12. Some of the additional information may be received, for example, through manual data input 73 of the vehicle information system or input by the driver through the user terminal 72. Examples include information indicating various types of driving load conditions, e.g., whether the vehicle is pulling a trailer, whether the trunk and/or other storage compartments are fully loaded, whether the vehicle is carrying a load on the roof, etc. Additional information that may be manually input includes driving route information (e.g., starting point, destinations, etc.) when not determined automatically by the navigation system), driving times, driving days, the number of passengers in the vehicle during a given trip, and driver comfort level as well as other information.

The storage area 12 therefore creates a historical record of data that may correspond to the vehicle and/or its particular driver over time. When the vehicle is driven by multiple drivers, the information in storage area 12 may be stored on a per-driver basis. In order to allow for efficient processing, in one embodiment the information may be stored in predetermined fields or in a predetermined format to allow for targeted data receival in accordance with the operations to be performed by the battery manager 10. The storage area 12 is shown as part of the battery manager. In another embodiment, the storage area 12 may be located outside of and coupled to the battery manager 10.

The driving pattern estimator 13 estimates (or otherwise determines) one or more driving patterns based on the information stored in storage area 12. The driving patterns may include, for example, that the vehicle travels a specific route at a certain time, the vehicle travels a specific route on a particular day of the week (at the same time or at a random or irregular time), the vehicle travels a certain distance in one or more the aforementioned circumstances, the vehicle travels for a certain duration of time in one or more of the aforementioned circumstances, average vehicle speed, and/or the vehicle travels at a certain speed in one or more of the aforementioned circumstances, as well as other patterns. The driving patterns may also include different types of driving conditions including, but not limited to, different grades, different elevation changes, or different weather conditions.

The one or more driving patterns may be estimated, for example, by comparing similarities, consistencies, differences, and/or divergences of the data stored in the storage area. For example, the driving pattern estimator 13 may compare the information in storage area 12 to determine that the driver drives once in the morning and once in the evening at approximately the same times of day and/or same duration Monday through Friday of each week. Such a driving pattern may be identified by the logic of driving pattern estimator 13 as, for example, a pattern of commuting to work. In cases, where the vehicle is determined to pull a trailer with relative frequency on certain days, a hauling pattern may be recognized. In cases where routes are traveled (either the same or different) on Saturdays, a travel pattern may be estimated for a mom taking her children to a baseball practice or a game. Of course, other patterns may be estimated based on the particular types of information stored in the storage area 12.

The logic for the driving pattern estimator 13 may be implemented in a variety of forms. In some embodiments, the logic (e.g., a comparator) may compare one or more fields of data structures stored in the storage area 12 to locate matching data. When matches are found with at least a predetermined consistency over time, calendar similarities and/or another event- or data-driven basis, one or more corresponding driving patterns may be identified.

In some embodiments, machine-learning pattern recognition may be used to process the information in the storage area 12 in order to estimate one or more driving patterns for the vehicle. For example, a probabilistic classifier or predictive model may be used to determine one or more driving patterns. The classifier may identify a pattern when an associated probability corresponds to a confidence value that exceeds a predetermined threshold value. In one embodiment, machine-learning pattern recognition may be performed using a Bayesian approach. Other examples of pattern recognition that may be implemented by the driving pattern estimator 13 include decision-tree logic, linear or quadratic discriminant analysis, entropy classification, linear or Gaussian regression, Hidden Markov models, various statistical inference algorithms, neural networks or other forms of artificial intelligence.

When one or more of the aforementioned types of logic is used, the model or other forms of artificial intelligence may be trained based on one or more sets of initial data. The datasets may include data expected or otherwise anticipated to occur use of a vehicle by drivers in practical real-world circumstances. For example, the datasets may include various combinations of the types of information previously described. In some embodiments, combinations of this information may occur which may be used as a basis for training the model for pattern estimation, e.g., the vehicle travelled 15 miles between 7 am and 8 am Monday through Friday. In such a case, the model may be trained in use mode to locate such patterns in the information stored in storage area 12. The number of datasets used to train the model may vary among embodiments. Prior to implementation in the vehicle, the software (e.g., instructions) used to implement the driving pattern estimator may be evaluated and test (and if needed corrected) to achieve at least a predetermined level of accuracy. In this regard, it may be understood that the accuracy of the pattern estimation may increase with the number of datasets used in training the model.

The pattern selector 14 may select one or more driving patterns generated by the driving pattern estimator 13. The selection may be performed by the pattern selector 14 based on one or more selection criteria. In one embodiment, the pattern selector 14 may select one or more patterns indicated to have at least a predetermined probability as indicated by the driving pattern estimator 13. In one embodiment, the pattern selector may select pattern(s) that appear with at least a predetermined frequency over a given period of time, e.g., day or week. Other patterns may be selected based on one or more aspects relating to the travel route. For example, a route may be selected that is within a predetermined radius of or distance from a home location, for example, as indicated based on information stored in vehicle information system 70 and/or user terminal 72.

Other patterns may be selected on a per-driver basis. The identity of the driver may be determined based on the user terminal 72 connected to the vehicle information system 70 through a wired or wireless link. For example, when the connection is established information identifying the owner of a connected smartphone may be received by the vehicle information system and displayed on a vehicle screen. Patterns identified as being associated with a particular user terminal (and thus driver) may therefore be selected by the pattern selector.

In some embodiments, the vehicle may be used by a plurality of drivers. For example, the vehicle may be driven by a dad most of the time but by the wife in other cases. In such a situation, the pattern selector 14 may retrieve information (e.g., from the vehicle information system 70) to identify one of multiple drivers and then select patterns based on which driver corresponds to the pattern. In one example scenario, the pattern selector 14 may select a commuting pattern for the dad between Monday and Friday and may select another pattern for the wife on Saturdays when she takes her son to his baseball game. As will be described in greater detail below, different charging parameters may be predicted once a pattern is selected, and then the charging parameters may be used as a basis for charging the secondary battery in a future use case of the vehicle, e.g., based on the driver who is anticipated to drive the vehicle next given the selected pattern. Examples of these and other selection criteria data are discussed in greater detail below.

In some embodiments, the pattern estimator 14 may be considered to be an optional feature of the battery manager 10. In this case, all patterns recognized by the driving estimator 13 (or at least ones satisfying a threshold value and/or one or more other predetermined criteria) may be input into the charging parameter prediction engine 15. Embodiments of the operation of the charging parameter prediction engine 15 are discussed below.

The charging parameter prediction engine 15 may predict one or more parameters for charging the secondary battery for a predicted future use case. This may be accomplished by determining the selected driving pattern (or alternatively, the driving pattern output from the driving pattern estimator 13), determining the charging behavior of a driver (e.g., received from storage area 12 through signal line 18), or based on a combination of the driving pattern and the charging behavior of the driver. This information (e.g., the driving patten and the charging behavior of a driver) may be collectively referred to as predicted charging attributes. Once these attributes have been received, one or more of charging parameters may be determined that meet the requirements of the predicted future use of the vehicle. The charging parameters may correspond to one or more state-of-charge (SOC) parameters and/or one or more parameters relating to the state-of-health (SOH) of the secondary battery.

In one embodiment, the charging parameter prediction engine 15 may predict one or more charging parameters which do not cause the secondary battery to be excessively charged given the driving pattern. Charging may be considered excessive, for example, in terms of whether or not to perform a charging operation, the number of charging sessions, charging rate or period, amount of charge and/or other parameters of or relating to the secondary battery. For example, in an electric vehicle, the secondary battery can degrade based on completely depleting the SOC of the battery, charging the secondary battery to full SOC unnecessarily, or charging the battery too quickly. These effects can increase degrade performance of the battery over time.

To avoid degradation due to these factors (and thus increase the useful life of the secondary battery), the charging parameter prediction engine 15 may predict one or more charging parameters for the secondary battery based on the driving pattern without there being excessive charging, e.g., in a manner which increases or optimizes battery life.

This may be accomplished in a variety of ways, e.g., statistically, using a rules-based approach, or another technique. In one embodiment, this may be accomplished using a rules-based approach. In implementing this approach, information indicative of one or more rules may be stored in association with one or more driving patterns. When a driving pattern is indicated (e.g., based on a pattern output from the driving pattern estimator 13 and/or the pattern selector 14), the logic of prediction engine 15 may locate the one or more rules for that driving pattern. The rule(s) may then be applied to determine one or more charging parameters for the secondary battery that will provide a driving range sufficient to satisfy the requirements of the future vehicle use, without excessively charging or otherwise causing unnecessary degradation to the battery, that would occur, for example, if the same charging parameters were used to charge the battery during every charging session without regard to future vehicle use or driver-specific patterns and requirements.

In one embodiment, the prediction engine 15 may access one or more look-up tables that store charging parameter(s) that satisfy the rule(s) corresponding to a particular driving pattern. As indicated, the charging parameter(s) may correspond to an SOC parameter. For example, one rule may indicate that the battery should be charged to only 50% capacity because the estimated driving pattern indicates that the following day the vehicle will only be driven for a short range or amount of time, e.g., is a non-commuting day. On the other hand, another rule may indicate that the battery should be charged at 90% or to full charge when the estimated driving pattern indicates that the following day is a commuting day where, for example, driving time and/or duration and driving speeds are expected to be greater than on a weekend.

In other cases, charging rate may be predicted, for example, based on the current time of hookup to the charging station, the starting time of the route the vehicle is to take, the distance the vehicle is predicted to travel and/or other considerations for a future use, e.g., for the following day or a subsequent time the vehicle is predicted to travel if not the following day. If the starting time is early in the morning, a faster charging rate parameter may be set based on a corresponding rule Conversely, if the starting time is later in the day, a slower charging rate may be set by the prediction engine 15 based on a corresponding rule. In other cases, both charging rate and amount of charge (or multiple other or different combinations charging parameters) may be determined by one or more corresponding rules. In one embodiment, some rules may take SOH of the secondary battery into consideration. For example, for batteries having a certain SOH level (e.g., older batteries), a different charging rate or amount may be used as opposed to batteries having a different SOH level. The prediction engine 15 may determine the full range of charging parameters for the secondary battery, or only one or more but less than all of the charging parameters. The look-up table(s) and their attendant rules may be stored, for example, in storage area 12 or a memory coupled to the included in battery manager 10.

The battery charging scheduler 16 may generate a charging schedule based on the one or more charging parameters output from the prediction engine 15. In one embodiment, the charging scheduler 16 may combine the charging parameter(s) output from the prediction engine 15 with other charging parameters which, for example, were not identified by the prediction engine 15. For example, the prediction engine 15 may output information indicative of an amount of charge (e.g., 50% capacity) the charging operation is to perform, but may not indicate a charging rate. In this case, the battery charging scheduler may combine the amount-of-charge parameter with a predetermined charging rate in generating a charging schedule. In another embodiment, amount-of-charge information may be output from the prediction engine 15 (with or without other charging parameters) and the charging scheduler 16 may generate a weekly schedule of charging for each pattern output from the pattern selector or the driving pattern estimator 13.

The output of the charging scheduler 16 is a schedule indicating the charging parameters for the secondary battery 30 that are to be used by the battery charging controller 20 during a charging operation at a future time. The future time may be a next charging session, e.g., the next time the electric vehicle is connected to a charging station or a next time induction-charging is to be performed. In some embodiments, the battery charging scheduler may retain an entire weekly (or other period of time) charging schedule to be used for the vehicle. The schedule may indicate the charging parameters to be used for corresponding multiple driving patterns of the vehicle over the time period, whether the vehicle is to be driven for the same driver or different drivers during that period. In some embodiments, the charging scheduler 16 may be considered to be an optional feature. For example, when the charging parameter prediction engine 15 outputs all of the charging parameters for the secondary battery for a future use of the vehicle, the output of the prediction engine 15 may be input directly into the battery charging controller 20.

The battery charging controller 20 may controller charging power of the secondary battery 30 based on the charging schedule output from the battery charging scheduler 16, or if omitted the charging parameters output from the charging parameter prediction engine 15. The charging operation may receive the power from a power source such as a charging station or an on-board induction power source of the vehicle, and then regulate a charging current I for a duration and rate that corresponds to the indicated charging parameters. Prior to performing the charging operation, controller 20 may detect the residual charge ($V_{charge}$) left in the secondary battery 30, so that the amount of additional charge required to meet the predicted amount of charge can be known and used to control the duration the charging current $I_{Charge}$ is input into the battery. The value of $V_{charge}$ may be monitored throughout the charging process until the designated amount of charge is reached.

The secondary battery 30 may include one or more battery cells or one or more battery packs, each including one or more battery cells, connected to power the vehicle. The individual battery cells may be, for example, lithium ion batteries, nickel-metal hydride batteries, lead acid batteries, ultracapacitors, molten salt batteries, lithium sulphur batteries, or another type of rechargeable battery for powering an electric vehicle. In addition, the battery may have any number of configurations, including but not limited to a square, rolled, or stacked or other configuration.

Figure 2:
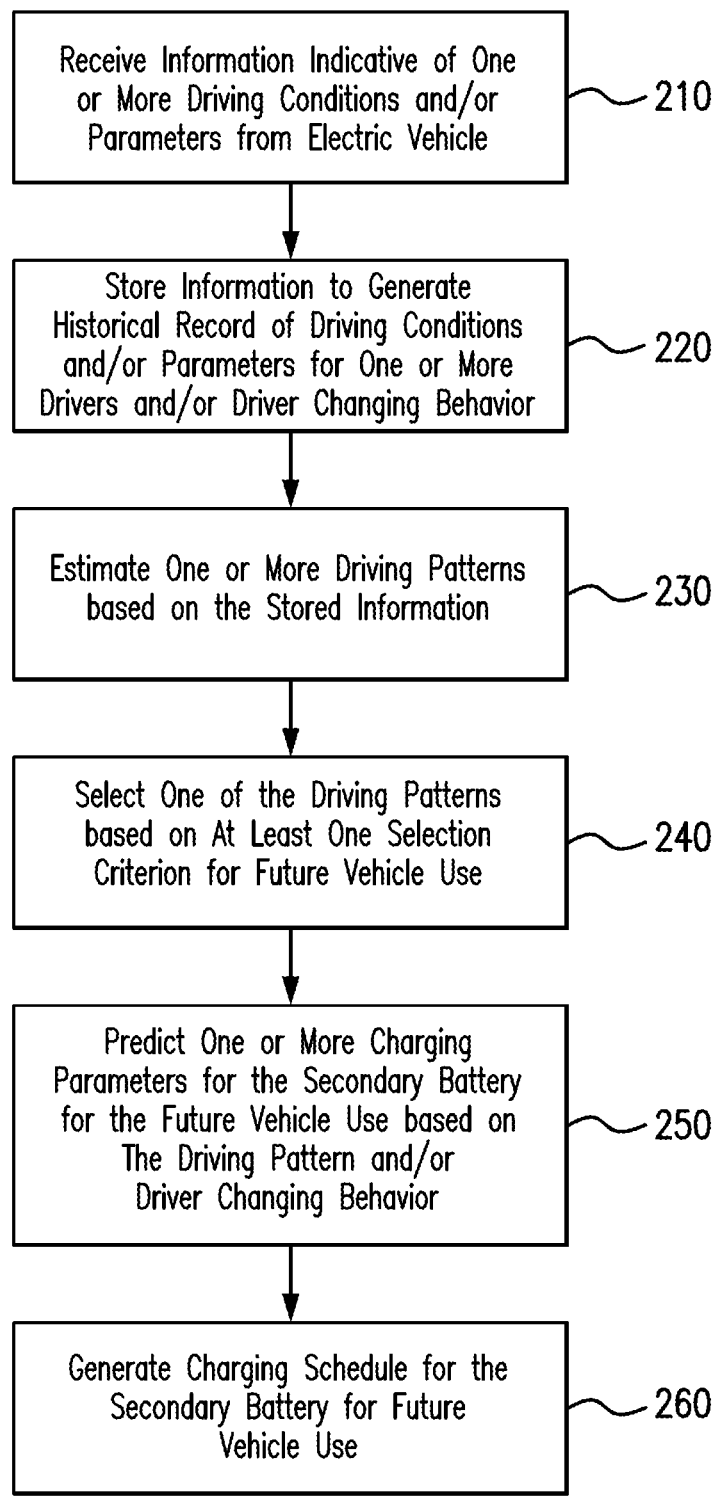
FIG. 2 shows an embodiment of a method for charging a secondary battery.

FIG. 2 shows operations included in an embodiment of a method for controlling the charging of a secondary battery of an electric vehicle, which method may be performed, for example, by the system of FIG. 1. In another embodiment, a different system may performed one or more of the operations of the method.

Referring to FIG. 2, the method includes, at 210, receiving information indicative of one or more driving conditions and/or parameters of the electric vehicle. This information may be received in real time and/or before or after the electric vehicle has been used by a driver. The information may be received by any of the associated features of the vehicle information system 70 previously described, one or more of vehicle sensors 75, directly from a user terminal (e.g., smart phone) of a driver, information from a host system or network or a combination of the above. In one embodiment, navigation system 71 may store a history of route-related information which may be sent to the battery manager 10 for use as described herein. In addition, the received information may indicate the charging behavior of the electric vehicle as performed by a driver.

At 220, the information indicative of the one or more driving conditions, driving parameters, and/or information indicative of the charging behavior of a driver are stored for access by the battery manager 10. In one embodiment, the information may be stored for one driver or multiple drivers (e.g., on a per-driver basis) of the vehicle. For example, this information may be stored in storage area 12 in order to generate a historical record of driving activity. The information may be stored in the manner previously described, e.g., in predetermined fields of a data structure that allow for efficient comparison and pattern estimation. Examples of information that may be received from the information sources and stored in storage area 12 may include the ones described herein and those set forth in FIG. 3.

At 230, one or more driving patterns are estimated based on the information stored in the storage area 12. The driving pattern(s) may be determined by the driving pattern estimator 13, for example, by comparing similarities, consistencies, differences, and/or divergences of the information stored in the storage area. In some embodiments, various forms of machine-learning pattern recognition and model based analysis may be used to estimate the driving pattern (s), as previously discussed.

Examples of driving patterns include, but are not limited to, a commuter pattern, e.g., a particular driver driving once in the morning and once in the evening at approximately the same times and/or same duration Monday through Friday of each week. Other driving patterns may be estimated for weekend use, e.g., driving kids to baseball practice. Still other driving patterns may correspond to various increased load patterns, for example, based on the vehicle pulling a trailer with relative frequency on certain days. Additional driving patterns include, but are not limited to, the vehicle traveling a specific route at a certain time, the vehicle traveling a specific route on a particular day or days of the week (at the same time or at a random or irregular time), the vehicle traveling a certain distance in one or more the aforementioned circumstances, the vehicle traveling for a certain duration of time in one or more of the aforementioned circumstances, average vehicle speed, and/or the vehicle travels at a certain speed in one or more of the aforementioned circumstances.

At 240, one of the driving pattern(s) generated in operation 230 may be selected to control charging of the vehicle for a future use case. The selection may be performed by the pattern selector 14 based on one or more selection criteria. In one embodiment, the pattern selector may receive information such as clock information, calendar information, weather information, vehicle status information and/or other information that may be used as a basis for the selection criteria. In one embodiment, the selection criteria may be based on various forms of manually input information used to control selection of a desired driving pattern by a driver, or in some cases override a predicted selection of a driving pattern in favor of another driving pattern.

Figure 4:
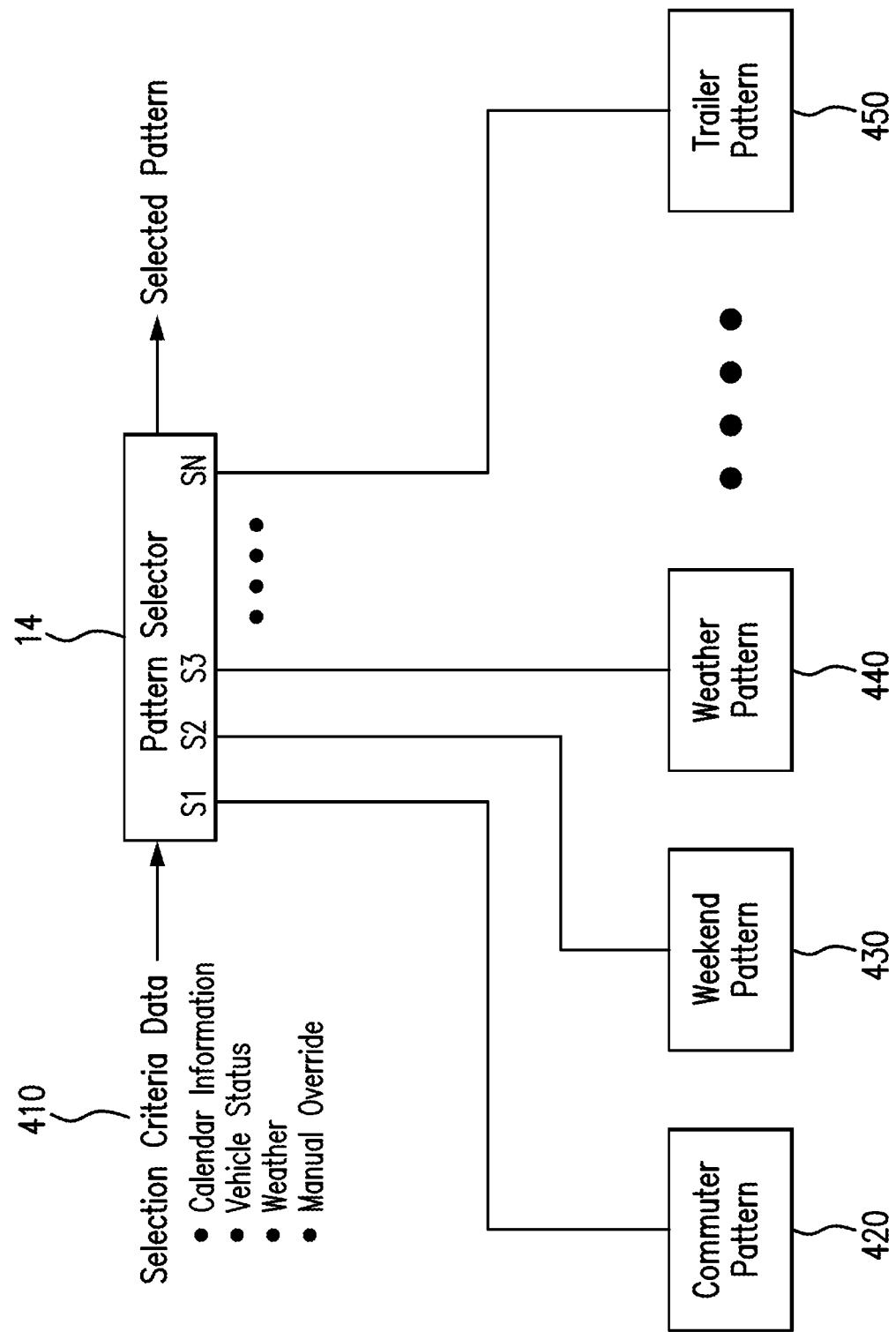
FIG. 4 shows an embodiment of a driving pattern selector.

FIG. 4 shows an example of how a driving pattern may be selected by pattern selector 14. In this example, the pattern selector 14 receives data 410 which may be used as the selection criteria or as a basis for determining criteria for selecting one or more driving patterns determined by the driving pattern estimator 13. In this embodiment, N driving patterns are shown including a commuter driving pattern 420, a weekend driving pattern 430, a weather driving pattern 440, and a trailer driving pattern 450. One of these patterns may be selected based on the received selection criteria, which by way of illustration is shown to include calendar information, vehicle status, weather, or manual override information that currently exists in real time for interpretation by the pattern selector 14. Based on the selection criteria data 410, the pattern selector 14 generates selection signal S1 to SN to select one of the driving patterns.

For example, the pattern selector 14 may determine that the current day is Sunday based on received calendar information. In addition, the weather information may indicate dry and sunny and the vehicle status information may indicate that no trailer travel is anticipated for the next day and that only one person will be in the car the following day. Based on this data, the logic of the pattern selector 14 may determine that the calendar information is to take priority over the weather information and vehicle status information as the data to be used in selecting the driving pattern.

When the selection criteria corresponds to the day of the week in the above case, the pattern selector 14 may select the commuter driving pattern 420 in order to prepare the vehicle for charging up to a range that will meet the commuter driving schedule for the work day on Monday, e.g., the logic of the pattern selector 14 may select the commuter driving pattern on Sunday night for charging the secondary battery to full capacity for the Monday morning commute. In another case, when the pattern selector receives calendar information indicating that the current day is Friday, a weekend (or Saturday) driving pattern may be selected on Friday night in order to control charging of the secondary battery to some percentage of (less than) full capacity, in order to match the reduced driving range indicated by the selected pattern.

In some cases, there may be an apparent conflict between the selection criterial data. For example, the weather information may indicate bad weather the following day and that the following day is a commute day for the driver. In this case, a predetermined priority order may be used by the logic of the selector 14 as a basis for determining which driving pattern to select.

In one embodiment, prior to performing the selection operation, a preliminary check may be performed to determine whether the secondary batter already has a charge sufficient to meeting the selected (or manually input) driving pattern. If so, the charging operation may be terminated and the battery manager may return to monitoring mode in order to control charging for another future use case. The future use case may be the next time the vehicle is to be used, which, for example, may occur the following day or may occur at another time predicted based on the driving pattern that is selected.

At 250, one or more charging parameters for the secondary battery 30 are predicted for charging the vehicle in preparation for anticipated future travel. The prediction may be performed by the charging parameter prediction engine 15 based on the selected driving pattern by the pattern selector 14 (or alternatively, the driving pattern output from the driving pattern estimator 13), the information indicative of the charging behavior of the driver, or a combination thereof. The one or more charging parameters are determined to meet the requirements of the predicted future use of the vehicle. The charging parameters may correspond, for example, to one or more state-of-charge (SOC) parameters and/or one or more parameters relating to the state-of-health (SOH) of the secondary battery.

In one embodiment, the charging parameter prediction engine 15 may predict one or more charging parameters which do not cause the secondary battery to be excessively charged given the driving pattern. As previously discussed, charging may be considered excessive, for example, in terms of whether or not to perform a charging operation, the number of charging sessions, charging rate or period, amount of charge and/or other parameters of or relating to the secondary battery. In an electric vehicle, the secondary battery can degrade based on completely depleting the SOC of the battery, charging the secondary batter to full SOC unnecessarily, or charging the battery too quickly. These effects can increase degrade performance of the battery over time. To avoid degradation due to these factors (and thus increase the useful life of the secondary battery), one or more charging parameters for the secondary battery may be predicted based on the driving pattern without there being excessive charging. This may be accomplished in a variety of ways.

In one embodiment, one or more charging parameters for a driving pattern may be statistically determined. For example, values corresponding to secondary battery size, state-of-charge, energy consumption during travel, vehicle range and/or other statistical data may be stored in a memory accessible by the battery manager 10 in the vehicle. These values may be interrelated, for example, based on engineering vehicle performance tests, desired performance requirements and/or practice use of the vehicle over time. Thus, knowing some of the values in the chart may be used as a basis for determining one or more other values in the chart.

In such a case, the battery size of the electric vehicle is a known value determined by the manufacturer. In addition, the range of travel and the corresponding consumption of charge in the battery may be known by the particular driving pattern that is selected to meet the future use. Knowing these values, one or more state-of-charge parameters may be determined. Given these values, extrapolation techniques may be used to derive other values including one or more charging parameters of the battery that satisfy the requirements of a given precited driving pattern for future use of the vehicle. In other embodiments, different statistical techniques may be used.

Figure 5:
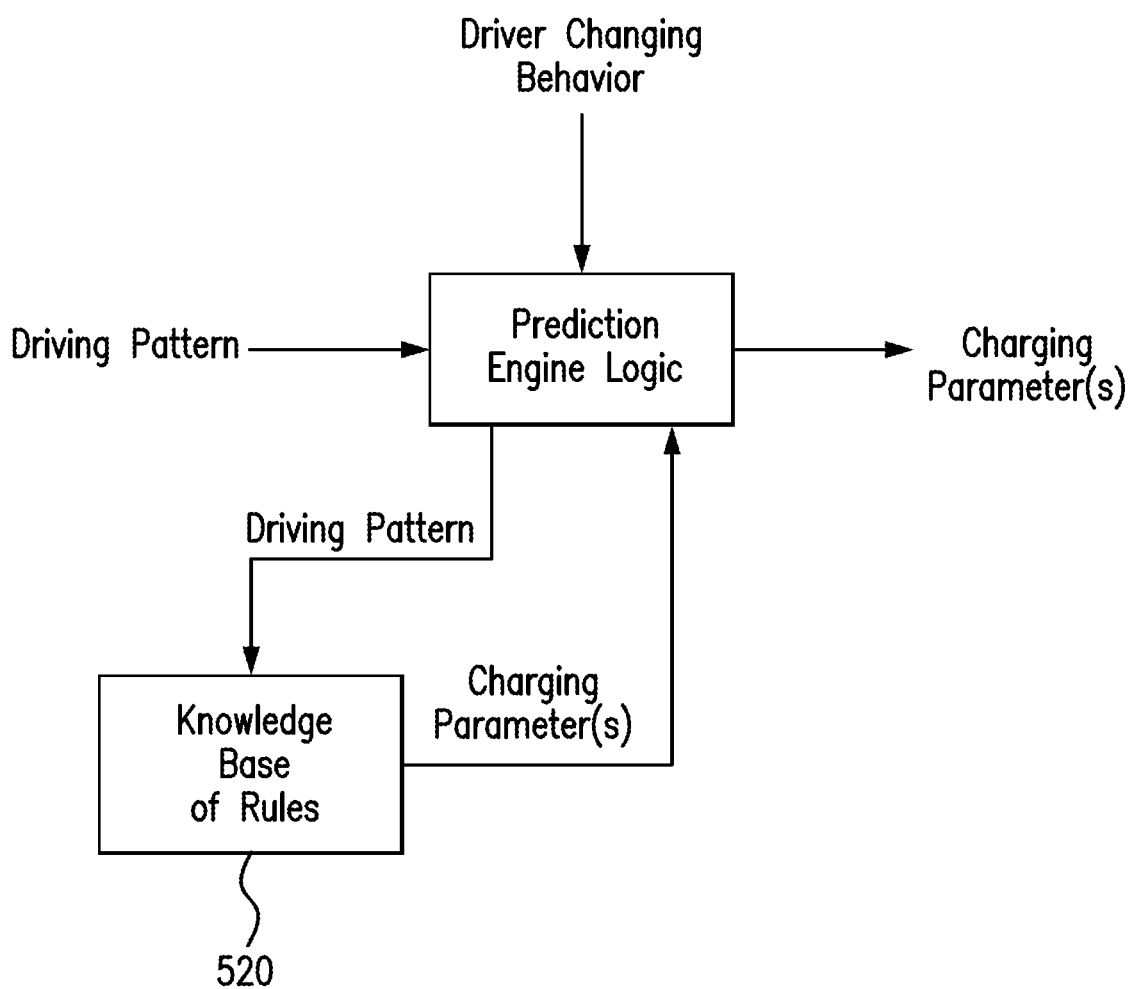
FIG. 5 shows an example block diagram of a subsystem for predicting at least one battery charging parameter.

FIG. 5 shows an embodiment of performing a rules-based approach to predicting one or more charging parameters for the secondary battery. In implementing this approach, information indicative of one or more rules may be stored in association with one or more driving patterns in a knowledge base 520. The knowledge base may correspond to a predetermined portion of storage area 12 or may be included in another storage area accessible by the battery manager 10. When a driving pattern is indicated (e.g., based on a pattern output from the driving pattern estimator 13 or the pattern selector 14) and/or information indicative of driver charging behavior is received, the logic 510 of prediction engine 15 may locate the one or more rules for that driving pattern in the knowledge base. The rule(s) may then be applied to determine one or more charging parameters for the secondary battery that will provide a driving range sufficient to satisfy the requirements of the future vehicle use, without excessively charging or otherwise causing unnecessary degradation to the battery, that would occur, for example, if the same charging parameters where used to charge the battery during every charging session without regard to future vehicle use or driver-specific patterns and requirements.

FIG. 6 shows an example of a look-up table that may be used to implement the rules-based approach. The look-up table includes a list of driving patterns 610, a list of rules 620, Time-until-Use information 630, and a list of charging parameters 640. The list of driving patterns 610 may include any of those patterns, for example, estimated by the driving pattern estimator 13. The list of rules 620 may include one or more rules for each driving pattern in the list of driving patterns 610. The Time-until-Use information 630 may indicate a time until the vehicle is to be used for the future use trip and may be determined, for example, based on the difference between a timer or clock of the vehicle and the starting time of the trip as determined by the driving pattern. For example, the current time may be 10 pm on Sunday night for a future trip beginning at 8 am Monday, which corresponds to 10 hours. The list of charging patterns 640 may include or more charging patterns for the rule(s) and Time-until-Use information corresponding to respective ones of the driving patterns.

In FIG. 6, four driving patterns are shown: commuter pattern, weekend pattern, weather pattern, and trailer pattern with corresponding information in the other lists. In an alternative embodiment, the Time-until-Use values may be omitted and/or other lists of relevant information for determining one or more charging parameters may be added.

In operation, once a driving pattern has been indicated, the logic of the charging parameter prediction engine 15 may locate the pattern in list 610 and determine one or more rules associated with that pattern in list 620. For example, the rule corresponding to a commuter pattern 611 may indicate that a first range of travel (miles/km) 621 for a commute a particular driver of the electric vehicle has each weekday. The first range of travel 621 and the corresponding Time-until-Use information 631 may then be used as a basis for determining an SOC charge amount of 60% at a normal charging rate 641 for the battery.

In another example, the rule corresponding to a weekend pattern 612 may indicate a second range of travel 622 for using the vehicle on the weekend. The second range of travel 622 may be less than the first range of travel and may, along with Time-until-Use information 631 may be used as a basis for determining an SOC charge amount of 40% at a slow battery charging rate 642.

In another example, the rule corresponding to a bad weather pattern (e.g., snow) 613 may indicate an extended duration of travel 623 (because the vehicle might get stuck in the snow) with corresponding Time-until-Use Information 633. These values may be used as a basis for determining an SOC charge amount of 80% capacity at a fast charging rate 643.

In another example, the rule corresponding to a driving pattern of the vehicle pulling a trailer 614 may indicate an extended range of travel 624 with a Time-until-Use of 36 hours 634. These values may be used as a basis for determining an SOC charge amount of 80% at a slow charging rate 644 for the battery.

In all cases of FIG. 6, the prediction engine 15 adjusts the charging parameters to be less than a full charge, which prevents increase in battery resistance and lengthens the useful life of the battery based on the particular driving patterns observed by one or more drivers for a future use of the vehicle. The look-up table in FIG. 6 is just an example. A different lookup table including different patterns, rules, and/or charging parameters may be used in another embodiment.

At 260, a charging schedule may be generated based on the one or more charging parameters determined by the prediction engine 15. The charging schedule may be generated, for example, by battery charging scheduler 16 and may involve information indicative of the charging parameters to be used for one or more future vehicle uses for the same or different charging patterns over a predetermined period of time.

Figure 7:
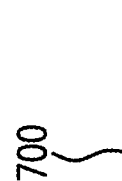
FIG. 7 shows an example of a battery charging schedule.

FIG. 7 shows an example of a charging schedule 700 that may be generated by the charging scheduler 16 and stored for access by the battery manager 10 over a coming one-week period. As shown in the schedule 700, a commuter pattern is indicated for work days of the driver, and other patterns (e.g., trailer pattern, hauling pattern, weekend pattern) are indicated for other days. Each pattern is associated with a corresponding set of charging parameters for charging the battery. In this example, four sets of charging parameters are indicated SOC Set 1 to SOC Set 4. The charging scheduler 16 may output information to the battery charging controller 20 based on a trigger event. The trigger event may be a time of connecting the vehicle to a charging station or a time during induction charging. In some embodiments, the trigger event may correspond to a time when the remaining charge in the secondary battery falls below a predetermined value.

In some embodiments, the charging schedule operation may be omitted. For example, when the charging parameter prediction engine 15 outputs all of the charging parameters for the secondary battery for a future use of the vehicle, the output of the prediction engine 15 may be input directly into the battery charging controller 20.

Figure 8:
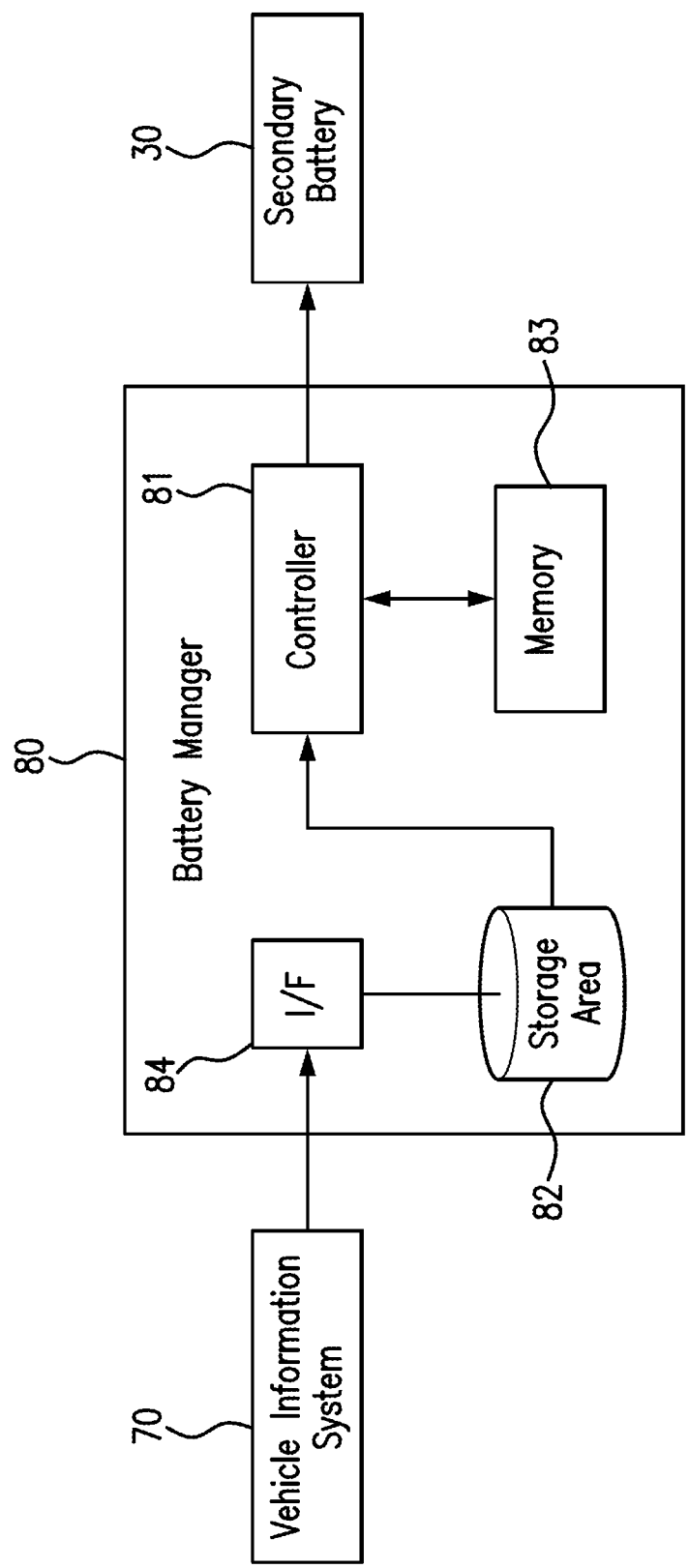
FIG. 8 shows an embodiment of a system for charging a secondary battery.

FIG. 8 shows an embodiment of a system 2 that may be used to control the charging of a secondary (e.g., repeatedly rechargeable) battery of an electric vehicle. The system 2 includes a battery manager 80 equipped with a controller 81, a storage area 82, a memory 83, and at least one interface 84. The controller 81 may, for example, perform the operations of the driving patter estimator 13, pattern selector 14, charging parameter prediction engine 15, and the battery charging scheduler 16 (if included) of the system 1 shown in FIG. 1 based on information received through interface 84. The controller 81 may perform these operations by executing instructions stored in memory 83, which, for example, may also store the code and instructions for implementing the models, algorithms, and other artificial intelligence features described herein.

The storage area 82 may store the same information as stored in storage area 12 of FIG. 1, and the interface 84 may receive information to be stored in storage area 82 from vehicle information system 70, sensor(s) 75, or from any of the other information sources described with respect to the system 1 of FIG. 1. In operation, the controller 81 generates charging parameters for controlling charging of the secondary battery 30. Charging of battery 30 may be performed through battery charging controller 20, which has been omitted in FIG. 8.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, logic, estimators, selectors, schedulers, prediction engines, and other signal generating and signal processing features of the embodiments described herein may be implemented in non-transitory logic which, for example, may include hardware, software, or both. When implemented at least partially in hardware, the controllers, processors, logic, estimators, selectors, schedulers, prediction engines, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, logic, estimators, selectors, schedulers, prediction engines, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments described herein.

Any reference in this specification to an "embodiment" means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with features of one or more other embodiments described herein to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although a number of illustrative embodiments are described herein, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A battery manager, comprising:
a pattern estimator to estimate a driving pattern of an electric vehicle;
a prediction engine to predict a charging parameter to prevent excessive recharging so as to provide partial recharging applied to a secondary battery to a level less than full capacity based on the driving pattern and driver recharging behavior, wherein the driver recharging behavior indicates a historic pattern of how often a driver typically recharges the electric vehicle over a period of time; and
a charging scheduler to output the charging parameter to control recharging of the secondary battery of the electric vehicle having at least two batteries,
wherein the pattern estimator is to estimate the driving pattern based on information from at least one information source of the electric vehicle and wherein the prediction engine is to predict the charging parameter of the secondary battery in preparation of a future use of the electric vehicle.

2. The battery manager of claim 1, wherein the future use of the electric vehicle corresponds to the estimated driving pattern.

3. The battery manager of claim 1, wherein:
the charging parameter is an amount of charge of the secondary battery, and
the amount of charge is less than a full charge of the secondary battery.

4. The battery manager of claim 3, wherein the amount of charge corresponds to a range of travel that satisfies the driving pattern of the future use of the electric vehicle.

5. The battery manager of claim 1, wherein:
the driving pattern is one of a plurality of different driving patterns estimated by the pattern estimator based on information from the at least one information source, and
the battery manager includes a pattern selector to select the driving pattern from the plurality of different driving patterns based on one or more criteria.

6. The battery manager of claim 5, wherein the different driving patterns include at least one of different ranges of travel or different driving conditions.

7. The battery manager of claim 5, wherein the charging scheduler is to generate a recharging schedule for the secondary battery and wherein the recharging schedule includes:
information indicating the plurality of different driving patterns,
information indicating one or more different charging parameters for respective ones of the different driving patterns, and
information indicating timings of when the different charging parameters are to be applied to recharge the secondary battery for respective ones of the different driving patterns.

8. The battery manager of claim 5, wherein the one or more criteria includes at least one of calendar information, vehicle status information, weather information, or manually input information.

9. The battery manager of claim 1, wherein the at least one information source is one of navigation information, number of passengers, vehicle status, driver comfort, or travel conditions.

10. The battery manager of claim 1, wherein the charging scheduler is to output the charging parameter to control charging of the secondary battery when the electric vehicle is connected to a battery charging station.

11. A method of managing an electric vehicle, comprising:
receiving information from at least one information source;
estimating a driving pattern based on the received information;
predicting a charging parameter to prevent excessive recharging so as to provide partial recharging applied to a secondary battery of the electric vehicle to a level less than full capacity based on the driving pattern and driver recharging behavior, the electric vehicle having at least two batteries, wherein the driver recharging behavior indicates a historic pattern of how often a driver typically recharges the electric vehicle over a period of time; and
outputting the charging parameter to control recharging of the secondary battery, wherein predicting the charging parameter includes predicting the charging parameter of the secondary battery in preparation of a future use of the electric vehicle.

12. The method of claim 11, wherein the future use of the electric vehicle corresponds to the estimated driving pattern.

13. The method of claim 11, wherein:
the charging parameter is an amount of charge of the secondary battery, and
the amount of charge is less than a full charge of the secondary battery.

14. The method of claim 13, wherein the amount of charge corresponds to a range of travel that satisfies the driving pattern of the future use of the electric vehicle.

15. The method of claim 11, wherein:
the driving pattern is one of a plurality of different driving patterns estimated based on information from the at least one information source, and
the battery manager includes a pattern selector to select the driving pattern from the plurality of different driving patterns based on one or more criteria.

16. The method of claim 15, wherein the different driving patterns include at least one of different ranges of travel or different driving conditions.

17. The method of claim 15, further comprising generating a recharging schedule for the secondary battery,
wherein the recharging schedule includes:

information indicating the plurality of different driving patterns, information indicating one or more different charging parameters for respective ones of the different driving patterns, and information indicating timings of when the different charging parameters are to be applied to recharge the secondary battery based on the user recharging behavior for respective ones of the different driving patterns.

18. The method of claim 15, wherein the one or more criteria includes at least one of calendar information, vehicle status information, weather information, or manually input information.

19. The method of claim 11, wherein the at least one information source is one of navigation information, number of passengers, vehicle status, driver comfort, or travel conditions.

20. The method of claim 11, further comprising outputting the charging parameter to control recharging of the secondary battery when the electric vehicle is connected to a battery charging station.

* * * * *